United States Patent
Chang et al.

(10) Patent No.: US 10,958,882 B2
(45) Date of Patent: Mar. 23, 2021

(54) PROJECTION DEVICE AND PHOTO COUPLER CIRCUIT FOR THE SAME

(71) Applicant: Qisda Corporation, Taoyuan (TW)

(72) Inventors: Wei-Chun Chang, Taipei County (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/882,584

(22) Filed: May 25, 2020

(65) Prior Publication Data

US 2020/0404227 A1 Dec. 24, 2020

(30) Foreign Application Priority Data

Jun. 18, 2019 (CN) .......................... 201910527287.6

(51) Int. Cl.
  *H04N 9/31* (2006.01)
(52) U.S. Cl.
  CPC ......... *H04N 9/3123* (2013.01); *H04N 9/3105* (2013.01)
(58) Field of Classification Search
  CPC ...... H04N 9/3123; H04N 9/3105; H04N 9/31; H04N 9/312

USPC ......................................... 348/744, 739, 750
See application file for complete search history.

(56) References Cited

U.S. PATENT DOCUMENTS 5,614,961 A * 3/1997 Gibeau ................ H04N 9/3129
    348/750
2019/0052850 A1* 2/2019 Iguchi .................. H04N 9/3123

* cited by examiner

*Primary Examiner* — Sherrie Hsia

(57) ABSTRACT

A projection device and a photo coupler circuit for the same are disclosed. The photo coupler circuit includes a logic unit, a number of integration units and a selection unit. The logic unit is configured to receive a number of first control signals and a number of first PWM signals from a main circuit of the projection device, and to output a number of second PWM signals and one or more second control signals according to the first control signals and the first PWM signals. The integration units are coupled to the logic unit. Each of the integration units is configured to generate an integration signal according to one of the second PWM signals. The selection unit is coupled to the integration units to select one of the integration signals to be output to a light source drive circuit of the projection device according to the second control signals.

19 Claims, 5 Drawing Sheets

PROJECTION DEVICE AND PHOTO COUPLER CIRCUIT FOR THE SAME

This application claims the benefit of People's Republic of China application Serial No. 201910527287.6, filed Jun. 18, 2019, the subject matter of which is incorporated herein by reference.

BACKGROUND OF THE INVENTION

Field of the Invention

The invention relates in general to a projection device and a photo coupler circuit for the same.

Description of the Related Art

In the presentation or the speech, projector is commonly used to share the screen of a person computer through the projection of image on a large screen. Photo coupler circuit is a component essential to existing projector. The size and the manufacturing cost of the drive circuit board will be reduced if the photo coupler circuit can be improved.

SUMMARY OF THE INVENTION

According to one embodiment of the present invention, a photo coupler circuit adapted to a projection device is disclosed. The photo coupler circuit includes a logic unit, a number of integration units and a selection unit. The logic unit is configured to receive a number of first control signals and a number of first pulse width modulation (PWM) signals from a main circuit of the projection device, and to output a number of second PWM signals and one or more second control signals according to the first control signals and the first PWM signals. The integration units are coupled to the logic unit. Each of the integration units is configured to generate an integration signal according to one of the second PWM signals. The selection unit is coupled to the integration units and is configured to select one of the integration signals to be output to a light source drive circuit of the projection device according to the one or more second control signals.

According to another embodiment of the present invention, a projection device is provided. The projection device includes a main circuit, a photo coupler circuit and a light source drive circuit. The photo coupler circuit includes a logic unit, a number of integration units and a selection unit. The logic unit is configured to receive a number of first control signals and a number of first PWM signals from the main circuit, and to output a number of second PWM signals and one or more second control signals according to the first control signals and the first PWM signals. The integration units are coupled to the logic unit. Each of the integration units is configured to generate an integration signal according to one of the second PWM signals. The selection unit is coupled to the integration units, and is configured to select one of the integration signals to be output according to the second control signals. The light source drive circuit is coupled to the photo coupler circuit and is configured to receive the integration signal output from the photo coupler circuit.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
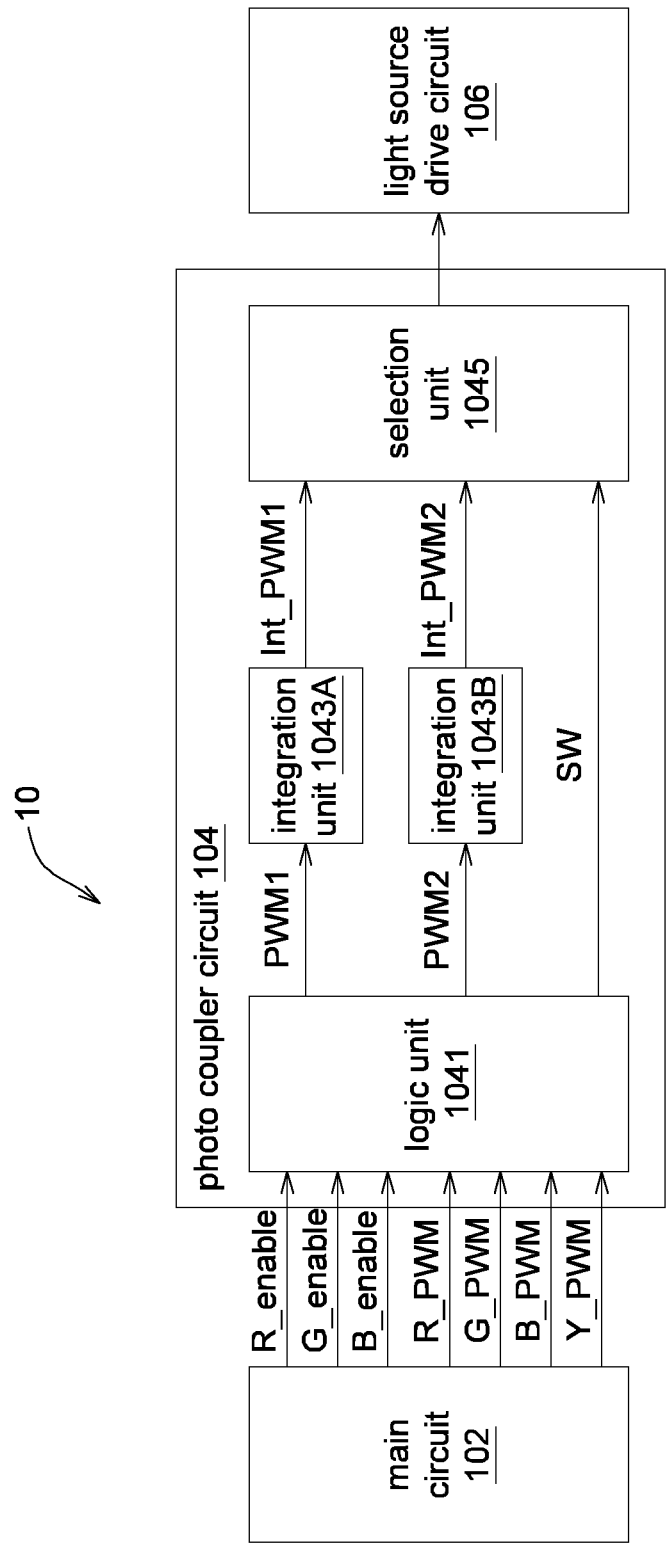
FIG. 1 is a schematic diagram of a projection device according to an embodiment of the present invention.

Referring to FIG. 1, a schematic diagram of a projection device according to an embodiment of the present invention is shown. The projection device 10 includes a main circuit 102, a photo coupler circuit 104 and a light source drive circuit 106. The main circuit 102 is configured to generate a number of first control signals and a number of first pulse width modulation (PWM) signals. The first control signals include a red enable signal R_enable, a green enable signal G_enable and a blue enable signal B_enable. The first PWM signals include a red PWM signal R_PWM, a green PWM signal G_PWM, a blue PWM signal B_PWM and a yellow PWM signal Y_PWM.

Figure 2:
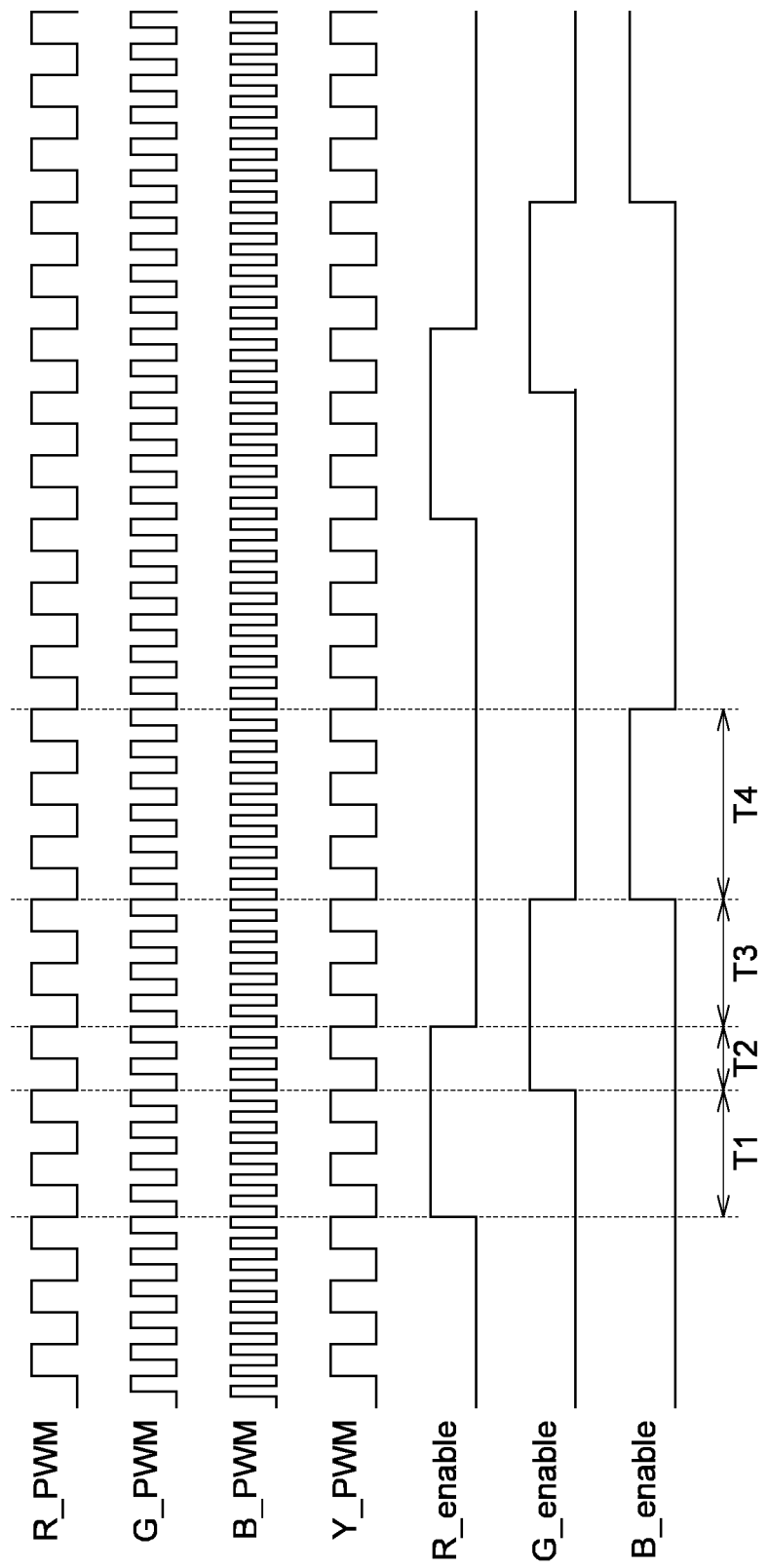
FIG. 2 is a waveform diagram of first PWM signals and first control signals.

The waveforms of the red enable signal R_enable, the green enable signal G_enable, the blue enable signal B_enable, the red PWM signal R_PWM, the green PWM signal G_PWM, the blue PWM signal B_PWM and the yellow PWM signal Y_PWM are illustrated in FIG. 2.

The photo coupler circuit 104 is coupled to the main circuit 102. The photo coupler circuit 104 includes a logic unit 1041, a number of integration units 1043A and 1043B and a selection unit 1045.

The logic unit 1041 receives the first PWM signals (the red PWM signal R_PWM, the green PWM signal G_PWM, the blue PWM signal B_PWM and the yellow PWM signal Y_PWM) and the first control signals (the red enable signal R_enable, the green enable signal G_enable and the blue enable signal B_enable) from the main circuit 102, and generates a number of second PWM signals PWM1 and PWM2 and a second control signal SW according to the first PWM signals and the first control signals. In an embodiment, the second PWM signal PWM1 is generated according to the following formula: PWM1=G_enable*G_PWM+Inv(G_enable)*R_PWM; the second PWM signal PWM2 is generated according to the following formula: PWM2=R_enable*Y_PWM+Inv(R_enable)*B_PWM; and the first control signal SW is generated according to the following formula: SW=R_enable*G_enable+B_enable, wherein * represents logic "AND" operation; + represents logic "OR" operation; and Inv represents logic "INVERSE" operation. The logic unit 1041 may include a number of logic gates formed of a number of transistors to implement the above formulas.

The integration units 1043A and 1043B are coupled to the logic unit 1041. The integration units 1043A is configured to generate an integration signal Int_PWM1 according to the second PWM signal PWM1. The integration units 1043B is configured to generate an integration signal Int_PWM2 according to the second PWM signal PWM2. In an embodiment, the integration units 1043A and 1043B respectively include a capacitor configured to integrate the received second PWM signals.

The selection unit 1045 is coupled to the integration units 1043A and 1043B. The selection unit 1045 selects one of the integration signals Int_PWM1 and Int_PWM2 to be output according to the second control signal SW.

The light source drive circuit 106 is coupled to the photo coupling unit 104. The light source drive circuit 106 drives a light source according to one of the integration signals Int_PWM1 and Int_PWM2 output from the selection unit 1045.

In an embodiment, the photo coupler circuit 104 further includes a number of first photo coupling units (not illustrated) and a second photo coupling unit (not illustrated). Each of the first photo coupling units is coupled between each of the integration units and the logic unit to transmit each of the second PWM signals in the form of light. The second photo coupling unit is coupled between the selection unit and the logic unit to transmit the second control signals in the form of light.

Principles of the present invention are disclosed below with accompanying drawing FIG. 2. During time T1, the red enable signal R_enable represents logic high (referred as high hereinafter); the green enable signal G_enable and the blue enable signal B_enable represent logic low (referred as low hereinafter); the second PWM signal PWM1 represents the red PWM signal R_PWM; the integration units 1043A performs integration on the red PWM signal R_PWM to generate the integration signal Int_PWM1; the second PWM signal PWM2 represents the yellow PWM signal Y_PWM; the integration units 1043B performs integration on the yellow PWM signal Y_PWM to generate the integration signal Int_PWM2; the second control signal SW is at low level; the selection unit 1045 selects the integration signal Int_PWM1 to be output to the light source drive circuit 106; and the light source drive circuit 106 drives the element of the light source (such as red LED) to generate a red beam corresponding to the brightness of the current intensity represented by the integration signal Int_PWM1 according to the integration signal Int_PWM1. Meanwhile, during time T2, the integration signal Int_PWM2 is integrated by the integration units 1043B. During time T2, the red enable signal R_enable and the green enable signal G_enable are at high level; the blue enable signal B_enable is at low level; the second PWM signal PWM1 represents the green PWM signal G_PWM; the integration units 1043A performs integration on the green PWM signal G_PWM to generate the integration signal Int_PWM1; the second PWM signal PWM2 represents the yellow PWM signal Y_PWM; the integration units 1043B performs integration on the yellow PWM signal Y_PWM to generate the integration signal Int_PWM2; the second control signal SW is at high level; the selection unit 1045 selects the integration signal Int_PWM2 to be output to the light source drive circuit 106; and the light source drive circuit 106 drives the element of the light source (such as red LED and green LED) to generate a yellow beam corresponding to the brightness of the current intensity represented by the integration signal Int_PWM2 according to the integration signal Int_PWM2. Meanwhile, during time T3, the integration signal Int_PWM1 is integrated by the integration units 1043A. During time T3, the green enable signal G_enable is at high level; the red enable signal R_enable and the blue enable signal B_enable is at low level; the second PWM signal PWM1 represents the green PWM signal G_PWM; the integration units 1043A performs integration on the green PWM signal G_PWM to generate the integration signal Int_PWM1; the second PWM signal PWM2 represents the blue PWM signal B_PWM; the integration units 1043B performs integration on the blue PWM signal B_PWM to generate the integration signal Int_PWM2; the second control signal SW is at low level; the selection unit 1045 selects the integration signal Int_PWM1 to be output to the light source drive circuit 106; and the light source drive circuit 106 drives the element of the light source (such as green LED) to generate a green beam corresponding to the brightness of the current intensity represented by the integration signal Int_PWM1 according to the integration signal Int_PWM1. Meanwhile, during time T4, the integration signal Int_PWM2 is integrated by the integration units 1043B. During time T4, the blue enable signal B_enable is at high level; the red enable signal R_enable and the green enable signal G_enable is at low level; the second PWM signal PWM1 represents the red PWM signal R_PWM; the integration units 1043A performs integration on the red PWM signal R_PWM to generate the integration signal Int_PWM1; the second PWM signal PWM2 represents the blue PWM signal B_PWM; the integration units 1043B performs integration on the blue PWM signal B_PWM to generate the integration signal Int_PWM2; the second control signal SW is at high level; the selection unit 1045 selects the integration signal Int_PWM2 to be output to the light source drive circuit 106; and the light source drive circuit 106 drives the element of the light source (such as blue LED) to generate a blue beam corresponding to the brightness of the current intensity represented by the integration signal Int_PWM2 according to the integration signal Int_PWM2. Meanwhile, during next time, the integration signal Int_PWM1 is integrated by the integration units 1043A.

For the invention to be better understood, the above disclosure is illustrated in Table 1, wherein "0" represents logic low, and "1" represents logic high.

TABLE 1

| Time | T1 | T2 | T3 | T4 |
|---|---|---|---|---|
| R_enable | 1 | 1 | 0 | 0 |
| G_enable | 0 | 1 | 1 | 0 |
| B_enable | 0 | 0 | 0 | 1 |
| PWM1 | R_PWM | G_PWM | G_PWM | R_PWM |
| PWM2 | Y_PWM | Y_PWM | B_PWM | B_PWM |
| SW | 0 | 1 | 0 | 1 |
| Output | Int_PWM1 | Int_PWM2 | Int_PWM1 | Int_PWM2 |

Figure 3:
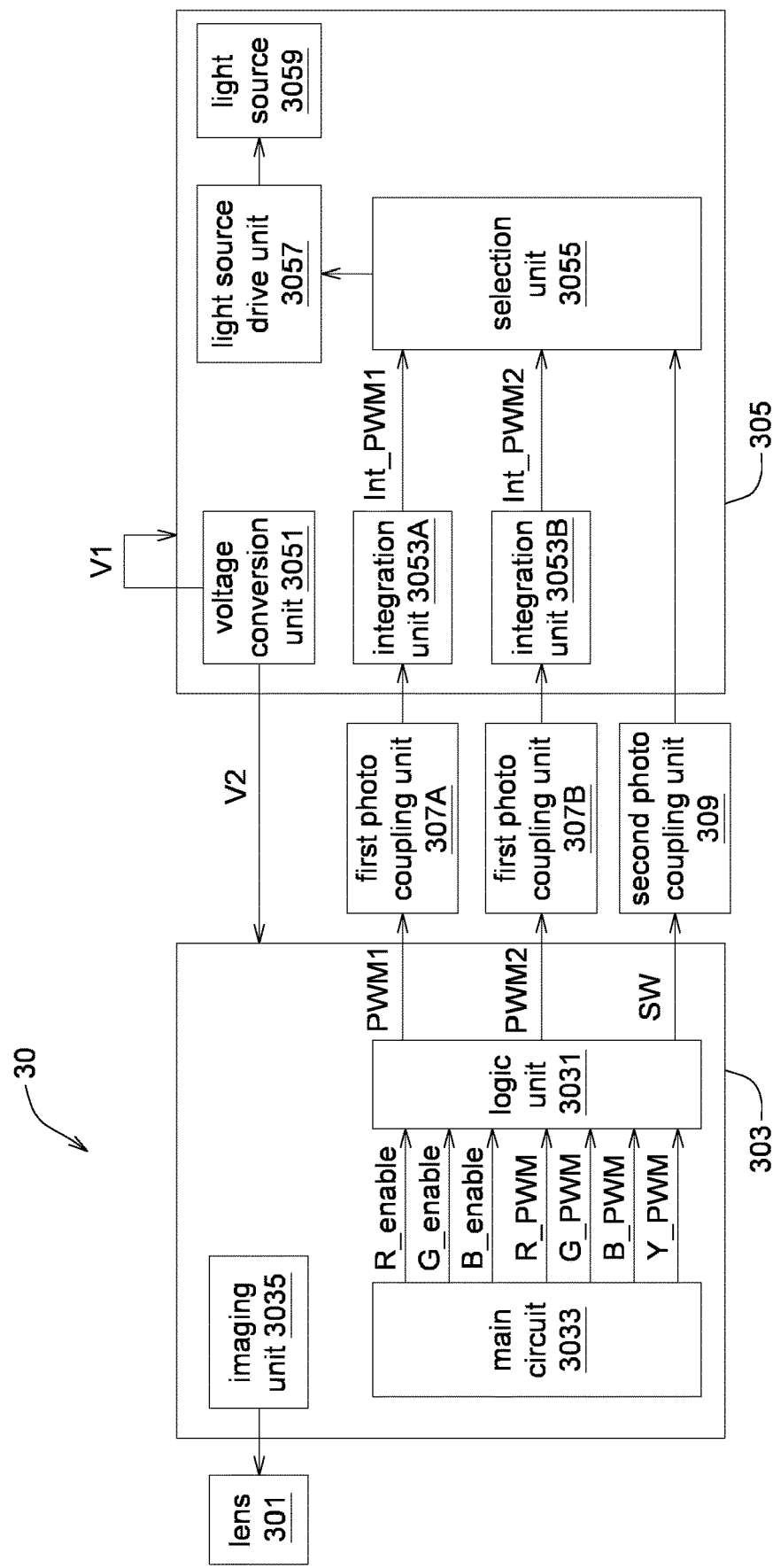
FIG. 3 is a schematic diagram of a projection device according to another embodiment of the present invention.

Referring to FIG. 3, a schematic diagram of a projection device according to another embodiment of the present invention is shown. The projection device 30 includes a lens 301, a low voltage block 303 and a high voltage block 305. The low voltage block 303 includes a logic unit 3031, a main circuit 3033 and an imaging unit 3035, wherein the logic unit 3031 can be the said logic unit 1041, and the main circuit 3033 can be the said main circuit 102. The high voltage unit 305 includes a voltage conversion unit 3051, a number of integration units 3053A and 3053B, a selection unit 3055, a light source drive circuit 3057 and a light source 3059, wherein the integration units 3053A and 3053B respectively can be the said integration units 1043A and 1043B; the selection unit 3055 can be the said selection unit 1045; and the light source drive circuit 3057 can be the said light source drive circuit 106. The voltage conversion unit 3051 is configured to receive a source current to generate a first voltage V1 and a second voltage V2, wherein the first voltage V1 is higher than the second voltage V2. The first voltage V1 will be provided to the high voltage block 305, and the second voltage V2 will be provided to the low voltage block 303. The light source 3059 may include a number of light emitting diodes (LEDs) configured to generate the red, the green, the blue and the yellow beams. The light source 3059 is driven by the light source drive circuit 3057 to generate a beam to the imaging unit 3035, which accordingly generates an image output via the lens 301. The projection device 30 further includes a number of first photo coupling units 307A and 307B and a second photo coupling unit 309. The first photo coupling units 307A and 307B are coupled between the logic unit 3031 and the integration units 3053A and 3053B to transmit the second PWM signals PWM1 and PWM2 in the form of light. The second photo coupling unit 309 is coupled between the logic unit 3031 and the selection unit 3055 to transmit the second control signal SW in the form of light.

The drive voltage for the low voltage block 303 is different from that for the high voltage block 305. Due to the considerations of interaction avoidance and safety enhancement, the low voltage block 303 and the high voltage block 305 are electrically isolated from each other (except for the drive voltage provided by the voltage conversion unit). The PWM signals and the control signals of each color are transmitted to the high voltage block 305 from the low voltage block 303 by the photo coupling unit in the form of light. In the present embodiment, the logic unit 3031 simplifies the first control signals and the first PWM signals, which are 7 signals in total, to the second PWM signals and the second control signal, which are 3 signals in total, and the quantity of the photo coupling unit connected between the low voltage block 303 and the high voltage block 305 will decrease accordingly (from 7 to 3), not only reducing the manufacturing cost but also downsizing the entire circuit.

Figure 4:
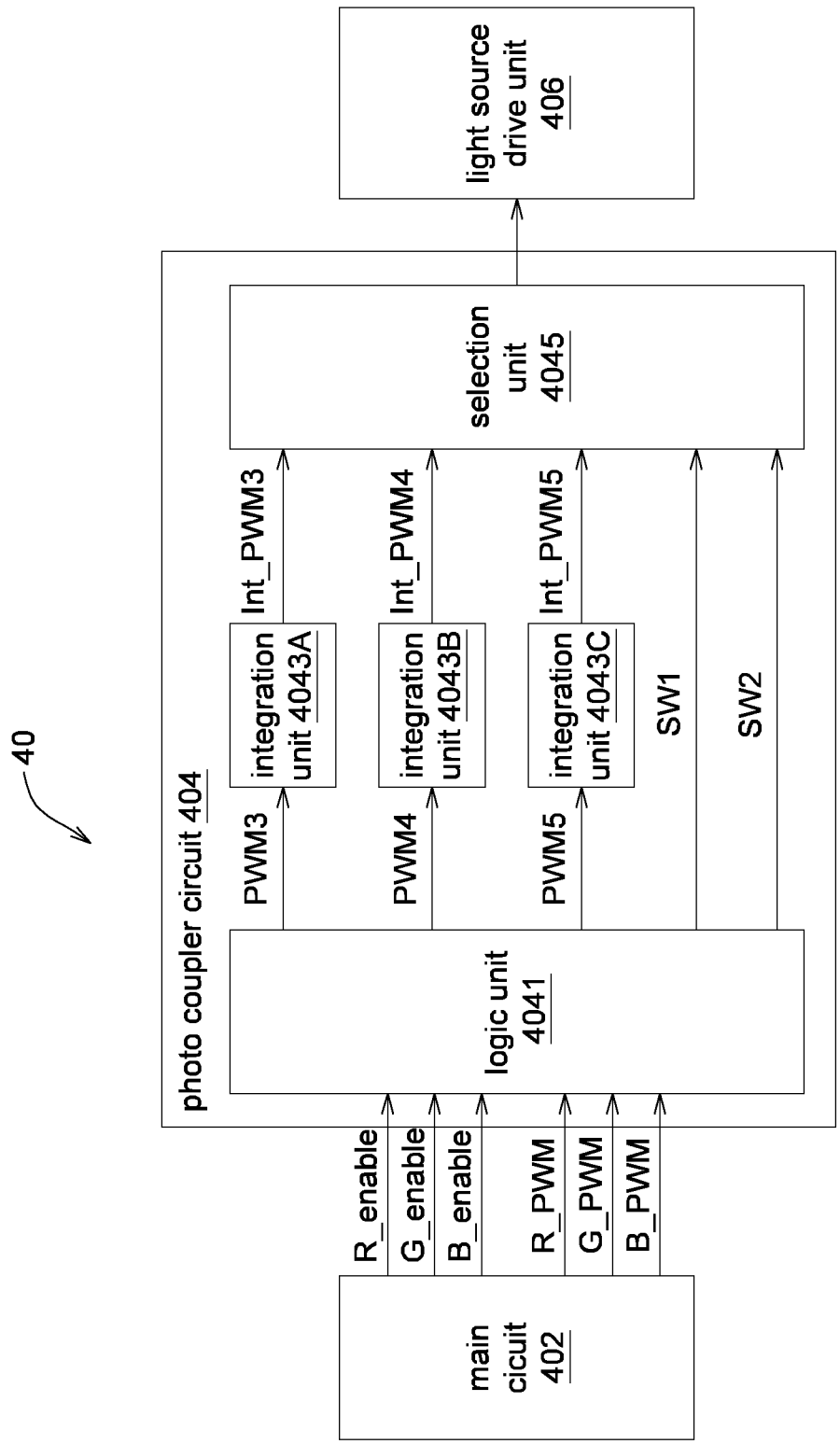
FIG. 4 is a schematic diagram of a projection device according to an alternate embodiment of the present invention.

Referring to FIG. 4, a schematic diagram of a projection device according to an alternate embodiment of the present invention is shown. The projection device 40 is similar to the projection device 10, and the differences are disclosed below.

Figure 5:
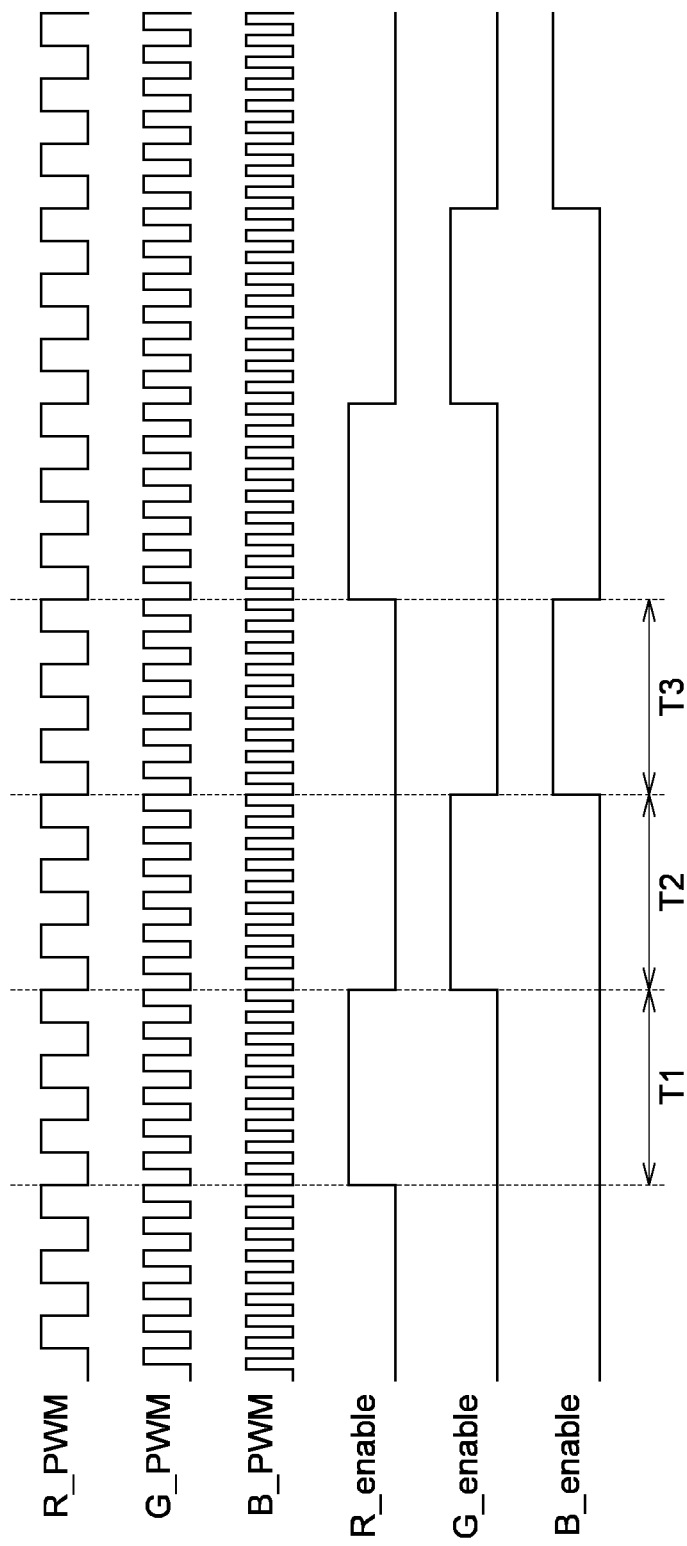
FIG. 5 is a waveform diagram of first PWM signals and first control signals.

The first control signals provided by the main circuit 40 include a red enable signal R_enable, a green enable signal G_enable and a blue enable signal B_enable; the first PWM signals include a red PWM signal R_PWM, a green PWM signal G_PWM and a blue PWM signal B_PWM; the waveform of each signal can be obtained with reference to FIG. 5. The logic unit 4041 generates 3 second PWM signals PWM3, PWM4, and PWM5 and 3 selection signals SW according to the first control signals and the first PWM signals. The integration units 4043A, 4043B, and 4043C generate the integration signals Int_PWM3, Int_PWM4, and Int_PWM5 according to the second PWM signals PWM3, PWM4, and PWM5, respectively. The selection unit 4045 selects one of the integration signal Int_PWM3, Int_PWM4, and Int_PWM5 to be output to the light source drive circuit 406 according to the second control signals SW1 and SW2. In the present example, the projection device 40 may include 3 first photo coupling units connected between the logic unit 4041 and the integration units 4043A, 4043B, and 4043C, and 2 second photo coupling units connected between the logic unit 4041 and the selection unit 4045.

Besides, the second PWM signals PWM3 can be generated according to the following formula: PWM3=(B_enable+R_enable)*R_PWM; the second PWM signals PWM4 can be generated according to the following formula: PWM4=(R_enable+G_enable)*G_PWM; the second PWM signals PWM3 can be generated according to the following formula: PWM5=(G_enable+B_enable)*B_PWM; the second control signal SW1 can be generated according to the following formula: SW1=R_enable; and the second control signal SW2 can be generated according to the following formula: SW2=G_enable, wherein * represents logic "AND" operation, and + represents logic "OR" operation. The selection unit 4045 selects one of the integration signal Int_PWM3, Int_PWM4, Int_PWM5 to be output to the light source drive circuit 406 according to the table illustrated below.

| SW1 | SW2 | Output |
|---|---|---|
| High | Low | Int_PWM3 |
| Low | High | Int_PWM4 |
| Low | Low | Int_PWM5 |

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A photo coupler circuit adapted to a projection device, the photo coupler circuit comprising:
   a logic unit configured to receive a plurality of first control signals and a plurality of first pulse width modulation (PWM) signals from a main circuit of the projection device, and to output a plurality of second PWM signals and one or more second control signals according to the first control signals and the first PWM signals;
   a plurality of integration units coupled to the logic unit, wherein each of the integration units is configured to generate an integration signal according to one of the second PWM signals; and
   a selection unit coupled to the integration units and configured to select one of the integration signals to be output to a light source drive circuit of the projection device according to the one or more second control signals.

2. The photo coupler circuit according to claim 1, wherein the first control signals comprise a red enable signal, a green enable signal and a blue enable signal; and the first PWM signals comprise a red PWM signal, a green PWM signal, a blue PWM signal and a yellow PWM signal.

3. The photo coupler circuit according to claim 2, wherein the second PWM signals have a quantity of 2, and one of the second PWM signals is generated according to the green enable signal, the green PWM signal and the red PWM signal.

4. The photo coupler circuit according to claim 2, wherein the second PWM signals have a quantity of 2, and one of the second PWM signals is generated according to the following formula:

PWM1=$G$_enable*$G$_PWM+Inv($G$_enable)*$R$_PWM, wherein PWM1 represents one of the second PWM signals; G_enable represents the green enable signal; G_PWM represents the green PWM signal; R_PWM represents the red PWM signal; * represents logic "AND" operation; + represents logic "OR" operation; and Inv represents logic "INVERSE" operation.

5. The photo coupler circuit according to claim 2, wherein the second PWM signals have a quantity of 2, and one of the second PWM signals is generated according to the red enable signal, the blue PWM signal and the yellow PWM signal.

6. The photo coupler circuit according to claim 2, wherein the second PWM signals have a quantity of 2, and one of the second PWM signals is generated according to the following formula:

PWM2=$R$_enable*$Y$_PWM+Inv($R$_enable)*$B$_PWM, wherein PWM2 represents one of the second PWM signals, R_enable represents the red enable signal, B_PWM represents the blue PWM signal, Y_PWM represents the yellow PWM signal; * represents logic "AND" operation; + represents logic "OR" operation; and Inv represents logic "INVERSE" operation.

7. The photo coupler circuit according to claim 2, wherein the one or more second control signals has a quantity of 1, and is generated according to the red enable signal, the blue enable signal and the green enable signal.

8. The photo coupler circuit according to claim 2, wherein the one or more second control signals has a quantity of 1, and is generated according to the following formula:

SW=$R$_enable*$G$_enable+$B$_enable, wherein SW represents the second control signals, R_enable represents the red enable signal; G_enable represents the green enable signal, B_enable represents the blue enable signal; * represents logic "AND" operation; + represents logic "OR" operation; and Inv represents logic "INVERSE" operation.

9. The photo coupler circuit according to claim 1, further comprising;
a plurality of first photo coupling units connecting the logic unit and the integration units to transmit the second PWM signals in the form of light; and
one or more second photo coupling unit connecting the logic unit and the selection unit to transmit the one or more second control signals in the form of light.

10. A projection device, comprising:
a main circuit;
a photo coupler circuit, comprising:
 a logic unit coupled to the main circuit and configured to receive a plurality of first control signals and a plurality of first PWM signals from the main circuit, and to output a plurality of second PWM signals and one or more second control signals according to the first control signals and the first PWM signals;
 a plurality of integration units coupled to the logic unit, wherein each of the integration units is configured to generate an integration signal according to one of the second PWM signals; and
 a selection unit coupled to the integration units and configured to select one of the integration signals to be output according to the one or more second control signals; and
a light source drive circuit coupled to the photo coupler circuit and configured to receive the integration signals output from the photo coupler circuit.

11. The projection device according to claim 10, wherein the first control signals comprise a red enable signal, a green enable signal and a blue enable signal; and the first PWM signals comprise a red PWM signal, a green PWM signal, a blue PWM signal and a yellow PWM signal.

12. The projection device according to claim 11, wherein the second PWM signals have a quantity of 2, and one of the second PWM signals is generated according to the green enable signal, the green PWM signal and the red PWM signal.

13. The projection device according to claim 11, wherein the second PWM signals have a quantity of 2, and one of the second PWM signals is generated according to the following formula:

PWM1=$G$_enable*$G$_PWM+Inv($G$_enable)*$R$_PWM, wherein PWM1 represents one of the second PWM signals; G_enable represents the green enable signal; G_PWM represents the green PWM signal; R_PWM represents the red PWM signal; * represents logic "AND" operation; + represents logic "OR" operation; and Inv represents logic "INVERSE" operation.

14. The projection device according to claim 11, wherein the second PWM signals have a quantity of 2, and one of the second PWM signals is generated according to the red enable signal, the blue PWM signal and the yellow PWM signal.

15. The projection device according to claim 11, wherein the second PWM signals have a quantity of 2, and one of the second PWM signals is generated according to the following formula:

PWM2=$R$_enable*$Y$_PWM+Inv($R$_enable)*$B$_PWM, wherein PWM2 represents one of the second PWM signals, R_enable represents the red enable signal, B_PWM represents the blue PWM signal, Y_PWM represents the yellow PWM signal; * represents logic "AND" operation; + represents logic "OR" operation; and Inv represents logic "INVERSE" operation.

16. The projection device according to claim 11, wherein the one or more second control signals has a quantity of 1, and is generated according to the red enable signal, the blue enable signal and the green enable signal.

17. The projection device according to claim 11, wherein the one or more second control signals has a quantity of 1, and is generated according to the following formula:

SW=$R$_enable*$G$_enable+$B$_enable, wherein SW represents the second control signals, R_enable represents the red enable signal; G_enable represents the green enable signal, B_enable represents the blue enable signal; * represents logic "AND" operation; + represents logic "OR" operation; and Inv represents logic "INVERSE" operation.

18. The projection device according to claim 10, further comprising;
a plurality of first photo coupling units connecting the logic unit and the integration units to transmit the second PWM signals in the form of light; and
one or more second photo coupling unit connecting the logic unit and the selection unit to transmit the one or more second control signals in the form of light.

19. The projection device according to claim 18, further comprising;
a lens;
a low voltage block, comprising:
 the main circuit:
 the logic unit: and
 an imaging unit;
a high voltage block, comprising:

a voltage conversion unit configured to receive a source current to generate a first voltage provided to the high voltage block and a second voltage provided to the low voltage block, wherein the first voltage is higher than the second voltage;
the integration units;
the selection unit;
the light source drive circuit; and
a light source, wherein the light source is driven by the light source drive circuit to generate a beam projected to the imaging unit, which accordingly generates an image output via the lens; and the first photo coupling units and the one or more second photo coupling unit are disposed between the low voltage block and the high voltage block.

\* \* \* \* \*